*(12)* United States Patent
Kanamarlapudi et al.

(10) Patent No.: US 11,963,214 B2
(45) Date of Patent: Apr. 16, 2024

(54) MEASUREMENT GAP AND SCHEDULING

(71) Applicant: QUALCOMM Incorporated, San Diego, CA (US)

(72) Inventors: Sitaramanjaneyulu Kanamarlapudi, San Diego, CA (US); Sathyanarayanan Raghunathan, San Diego, CA (US); Baojun Lu, San Diego, CA (US); Sivaram Srivenkata Palakodety, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 17/451,626

(22) Filed: Oct. 20, 2021

(65) Prior Publication Data

US 2022/0141842 A1 May 5, 2022

Related U.S. Application Data

(60) Provisional application No. 63/108,726, filed on Nov. 2, 2020.

(51) Int. Cl.
*H04W 52/02* (2009.01)
*H04W 72/1263* (2023.01)
*H04W 72/21* (2023.01)
*H04W 72/23* (2023.01)
*H04W 72/542* (2023.01)
*H04W 76/15* (2018.01)

(52) U.S. Cl.
CPC ..... *H04W 72/542* (2023.01); *H04W 72/1263* (2013.01); *H04W 72/21* (2023.01); *H04W 72/23* (2023.01); *H04W 76/15* (2018.02)

(58) Field of Classification Search
None
See application file for complete search history.

(56) References Cited

U.S. PATENT DOCUMENTS

| | | | |
|---|---|---|---|
| 2017/0006510 A1* | 1/2017 | Kaikkonen | H04W 48/16 |
| 2017/0094576 A1 | 3/2017 | Kazmi et al. | |
| 2017/0208523 A1* | 7/2017 | Yang | H04W 76/28 |
| 2017/0208619 A1* | 7/2017 | Yang | H04W 72/21 |
| 2017/0295590 A1* | 10/2017 | Loehr | H04W 72/21 |
| 2018/0014322 A1* | 1/2018 | Loehr | H04W 28/0278 |
| 2018/0213482 A1* | 7/2018 | Dortmund | H04W 64/006 |

(Continued)

OTHER PUBLICATIONS

International Search Report and Written Opinion dated Feb. 16, 2022 from corresponding PCT Application No. PCT-US2021-071981.

*Primary Examiner* — Sithu Ko
(74) *Attorney, Agent, or Firm* — QUALCOMM Incorporated

(57) ABSTRACT

Aspects are provided which allow a UE to trigger initiation of an SR procedure in response to a decrease in an amount of received data or uplink grants following a measurement gap. The UE receives data from a first base station. The UE performs a measurement of a downlink signal from a second base station based on a measurement configuration. The UE transmits a scheduling request in response to a decrease in at least one of an amount of received downlink data or a number of received grants to transmit uplink data after the measurement is performed. As a result, inefficient data stalls caused by erroneous DRX determinations by a base station may be avoided.

27 Claims, 8 Drawing Sheets

(56) References Cited

U.S. PATENT DOCUMENTS

| | | | |
|---|---|---|---|
| 2020/0344685 A1* | 10/2020 | Yi | H04W 72/21 |
| 2021/0120524 A1* | 4/2021 | Palle | H04W 68/005 |
| 2021/0227413 A1* | 7/2021 | Yang | H04W 72/0446 |
| 2021/0298114 A1* | 9/2021 | Nam | H04W 76/28 |
| 2022/0053530 A1* | 2/2022 | Ahmed | H04W 76/28 |
| 2022/0322121 A1* | 10/2022 | Cui | H04W 74/0833 |

* cited by examiner

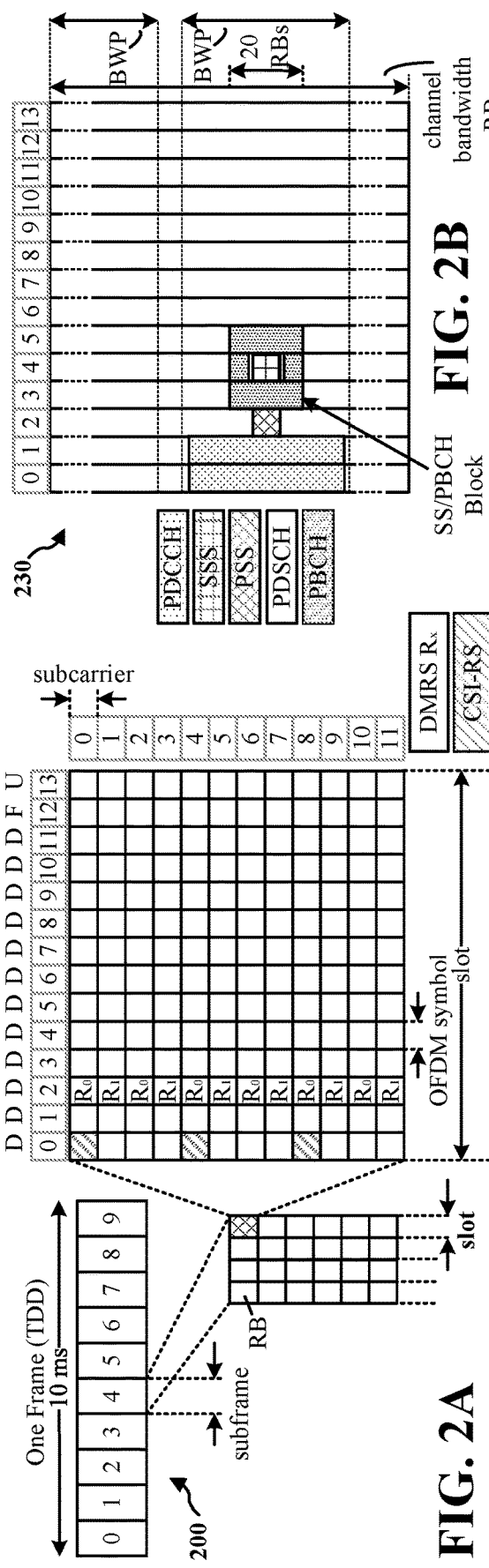
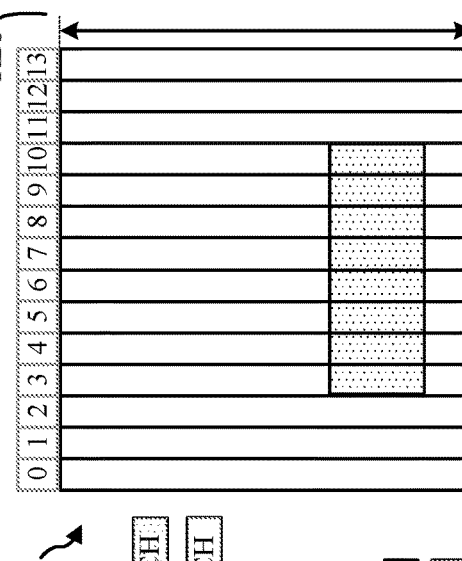
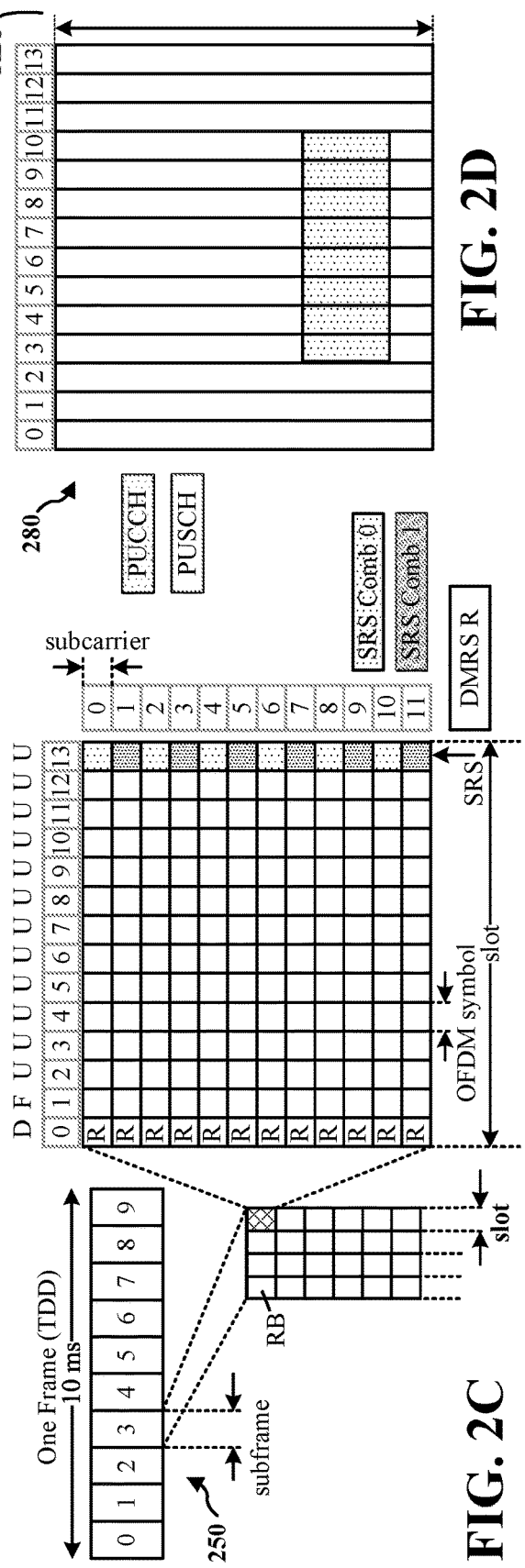
FIG. 2A
FIG. 2B
FIG. 2C
FIG. 2D

MEASUREMENT GAP AND SCHEDULING

CROSS REFERENCE TO RELATED APPLICATION(S)

This application claims the benefit of U.S. Provisional Application Ser. No. 63/108,726, entitled "MEASUREMENT GAP AND SCHEDULING" and filed on Nov. 2, 2020, the disclosure of which is expressly incorporated by reference herein in its entirety.

BACKGROUND

Technical Field

The present disclosure generally relates to communication systems, and more particularly, to a wireless communication system between a user equipment (UE) and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The apparatus receives data from a first base station. The apparatus performs a measurement of a downlink signal from a second base station based on a measurement configuration. The apparatus transmits a scheduling request in response to a decrease in at least one of an amount of received downlink data or a number of received grants to transmit uplink data after the measurement is performed.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
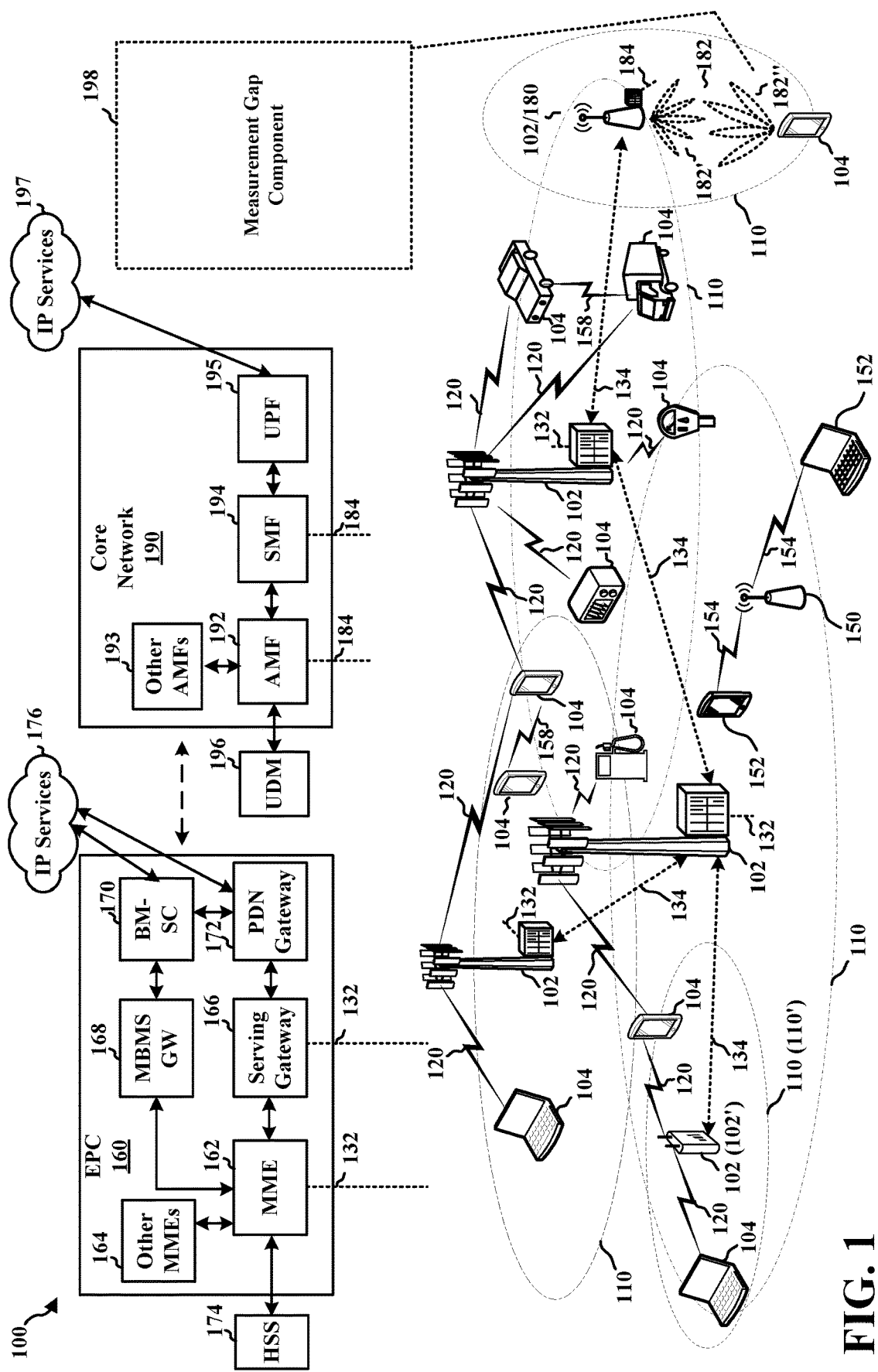
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A base station may perform various radio resource management (RRM) procedures, such as handovers, radio resource control (RRC) reconfigurations, and data scheduling, in response to information provided by a UE. For example, the base station may perform outer loop link adaptation (OLLA) to improve a radio link with the UE in response to channel measurements performed by the UE, hybrid automatic repeat request (HARQ) feedback from the UE, or other information from the UE (e.g. radio link control (RLC) information and upper layer acknowledgments).

With respect to channel measurements, the base station may provide a measurement configuration to the UE (e.g. in an RRC reconfiguration message) that configures the UE to perform and report such measurements. For example, the measurement configuration may include one or more measurement objects indicating the frequency, time location, and subcarrier spacing of reference signals the UE is to measure (e.g. synchronization signal block (SSB), channel state information reference signal (CSI-RS), demodulation reference signal (DMRS), etc.), a reporting configuration for each measurement object (e.g. event triggered reporting or periodic reporting), measurement gaps indicating the time periods during which the UE may perform measurements, and other measurement criteria. Based on the measurement configuration, the UE may report intra-frequency 5G New Radio (NR) measurements, inter-frequency NR measurements, or inter-radio access technology (RAT) measurements of Evolved Universal Mobile Telecommunications System (UMTS) Terrestrial Radio Access (E-UTRA) frequencies (e.g. 4G Long Term Evolution (LTE)) to the base station. For instance, during a configured measurement gap, the UE connected to a serving cell on one frequency and in one RAT may measure a reference signal receive power (RSRP) of a configured reference signal in a neighbor cell on a same frequency, on a different frequency, or in a different RAT, and the UE may report the measurement to the base station when the measurement exceeds a threshold. Based on the measurements, the base station may adapt its scheduling grants to the UE or perform other RRM procedures.

Additionally, the measurement configuration may also support multi-radio dual connectivity (MR-DC). In MR-DC, two different nodes or base stations may provide resources and data to the UE, including a master node (MN) and a secondary node (SN). One type of MR-DC is E-UTRA-NR dual connectivity (EN-DC), in which the MN is an Evolved Node B (eNB in LTE) and the SN is a gNodeB (gNB in NR). Generally, in EN-DC, the eNB/MN sends RRC messages to the UE including the measurement configuration, while the gNB/SN sends data to the UE. The eNB/MN may also send data to the UE. The measurement configuration configured by the eNB/MN may include similar information as described above (e.g. measurement objects, reporting configuration, measurement gaps, and other criteria), and the UE may similarly report intra-frequency, inter-frequency, or inter-RAT measurements to the eNB/MN or gNB/SN based on the measurement configuration. For example, during a configured measurement gap, the UE connected to a serving eNB and gNB in EN-DC may measure an RSRP of a configured reference signal in a neighbor cell, and the UE may report the measurement to the serving eNB or gNB when the measurement exceeds a threshold. Based on the measurements, the eNB/MN or gNB/SN may adapt its scheduling grants to the UE or perform other RRM procedures.

Generally, a UE may not be able to measure a target carrier frequency in a neighbor cell simultaneously while transmitting or receiving on a serving cell. Thus, to enable the UE to perform such measurements, the base station (for example, the eNB/MN in EN-DC) may configure measurement gaps for the UE. During a measurement gap, the UE may retune its antennas to the frequency or RAT of the neighbor cell, perform measurements in the neighbor cell, and then retune its antennas back to the serving cell. The UE may repeat the measurement process periodically during each configured measurement gap.

However, in some cases while a UE is performing measurements during a configured measurement gap, a serving base station may still send scheduling grants to the UE. For example, in EN-DC, a lack of measurement gap coordination may exist between the eNB/MN providing the measurement configuration and the gNB/SN providing scheduling grants for data. As a result, the gNB/SN may transmit scheduling grants to the UE during the measurement gaps. As the UE is unable to receive the grants since the UE has tuned out from the gNB/SN to perform measurements during these periods of time, the UE may not report HARQ feedback to the base station acknowledging (or not acknowledging) the scheduling grants. Consequently, the base station may inaccurately determine from the lack of HARQ feedback that the UE is currently in a discontinuous reception (DRX) mode, and thus the base station may refrain from further transmitting grants for a period of time. Generally in DRX, the UE monitors the radio channel periodically for downlink data during an "on" duration and powers down most of its circuitry to save battery life during an "off" duration, and therefore the base station typically transmits data to the UE during the on duration while refraining from transmitting data to the UE during the off duration to save resources. Accordingly, the base station may refrain from transmitting scheduling grants to the UE for a period of time based on the incorrect assumption that the UE is in the off duration, even though the UE may have completed its measurements, has retuned back to the serving gNB/SN, and is in the on duration during this period of time. Thus, data transmissions to the UE may be inefficiently stalled, resulting in reduced data throughput.

To prevent this data stalling from occurring in such cases, the UE may transmit a scheduling request (SR) to the serving base station after performing a measurement based on the measurement configuration. The SR may inform the serving base station that the UE is not in the DRX off duration and currently has data to transmit to the base station. For example, to initiate the SR procedure, the UE may trigger a buffer status report (BSR) (e.g. a regular BSR) in response to determining a decrease in an amount of data received from the serving base station or in an amount of uplink grants received from the serving base station following a measurement gap. To identify whether such decrease has occurred, the UE may first determine whether a threshold amount of data and/or a threshold amount of uplink grants, e.g. x bytes of data and/or z number of grants, was received from the base station within a threshold amount of time prior to performing the measurement, e.g. y ms before the measurement gap, where x, y, and z are preconfigured thresholds. If so, then the UE may next determine whether the UE tuned to a different frequency, RAT, or cell (relative to a frequency, RAT, or cell of the serving base station) to perform a measurement during the measurement gap. Afterwards, the UE may determine whether another threshold amount of data and/or another threshold amount of uplink grants, e.g. a bytes of data and/or c number of grants, was not received from the base station within another threshold amount of time after performing the measurement, e.g. b ms after the measurement gap, where a, b, and c are preconfigured thresholds and may respectively be the same as or different than x, y, and z. If so, the UE may determine that a decrease in received data or received grants has occurred since the measurement gap, and the UE may transmit SR accordingly to prevent the serving base station from incorrectly determining the UE to be in the DRX off duration. That is, if the UE determines that a threshold amount of data and/or a threshold amount of uplink grants was received within a threshold amount of time prior to the measurement gap, but that the same or a different threshold amount of data and/or uplink grants was not received within a threshold amount of time after the measurement gap (e.g., the thresholds were met before the gap but not after the gap), the UE may conclude that a decrease in received data or received grants has occurred, and thus the UE may transmit the SR in response to this conclusion. Thus, data stalling may be prevented and data throughput may be improved.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a measurement gap component 198 that is configured to receive data from a first base station, perform a measurement of a downlink signal from a second base station based on a measurement configuration, and transmit a scheduling request in response to a decrease in at least one of an amount of received downlink data or a number of received grants to transmit uplink data after the measurement is performed.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$. 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
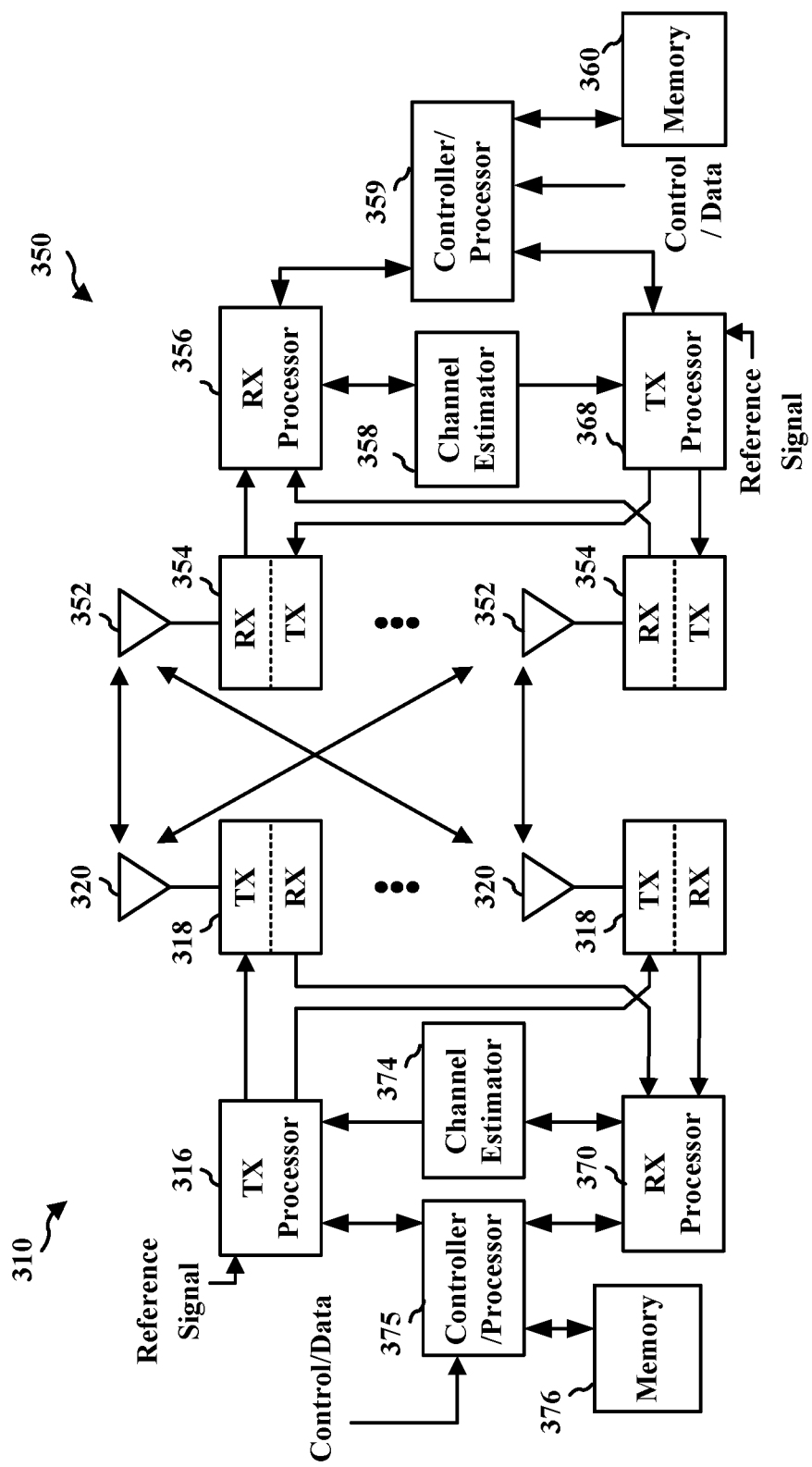
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with measurement gap component 198 of FIG. 1.

A base station may perform various RRM procedures, such as handovers, RRC reconfigurations, and data scheduling, in response to information provided by a UE. For example, the base station may perform OLLA to improve a radio link with the UE in response to channel measurements performed by the UE, HARQ feedback from the UE, or other information from the UE (e.g. RLC information and upper layer acknowledgments).

With respect to channel measurements, the base station may provide a measurement configuration to the UE (e.g. in an RRC reconfiguration message) that configures the UE to perform and report such measurements. For example, the measurement configuration may include one or more measurement objects indicating the frequency, time location, and subcarrier spacing of reference signals the UE is to measure (e.g. SSB, CSI-RS, DMRS, etc.), a reporting configuration for each measurement object (e.g. event triggered reporting or periodic reporting), measurement gaps indicating the time periods during which the UE may perform measurements, and other measurement criteria. Based on the measurement configuration, the UE may report intra-frequency NR measurements, inter-frequency NR measurements, or inter-RAT measurements of E-UTRA frequencies (e.g. LTE) to the base station. For instance, during a configured measurement gap, the UE connected to a serving cell on one frequency and in one RAT may measure an RSRP of a configured reference signal in a neighbor cell on a same frequency, on a different frequency, or in a different RAT, and the UE may report the measurement to the base station when the measurement exceeds a threshold. Based on the measurements, the base station may adapt its scheduling grants to the UE or perform other RRM procedures.

Additionally, the measurement configuration may also support MR-DC. In MR-DC, two different nodes or base stations may provide resources and data to the UE, including an MN and a SN. One type of MR-DC is EN-DC, in which the MN is an eNB (LTE) and the SN is a gNB (NR). Generally, in EN-DC, the eNB/MN sends RRC messages to the UE including the measurement configuration, while the gNB/SN sends data to the UE. The eNB/MN may also send data to the UE. The measurement configuration configured by the eNB/MN may include similar information as described above (e.g. measurement objects, reporting configuration, measurement gaps, and other criteria), and the UE may similarly report intra-frequency, inter-frequency, or inter-RAT measurements to the eNB/MN or gNB/SN based on the measurement configuration. For example, during a configured measurement gap, the UE connected to a serving eNB and gNB in EN-DC may measure an RSRP of a configured reference signal in a neighbor cell, and the UE may report the measurement to the serving eNB or gNB when the measurement exceeds a threshold. Based on the measurements, the eNB/MN or gNB/SN may adapt its scheduling grants to the UE or perform other RRM procedures.

Generally, a UE may not be able to measure a target carrier frequency in a neighbor cell simultaneously while transmitting or receiving on a serving cell. Thus, to enable the UE to perform such measurements, the base station (for example, the eNB/MN in EN-DC) may configure measurement gaps for the UE. During a measurement gap, the UE may retune its antennas to the frequency or RAT of the neighbor cell, perform measurements in the neighbor cell, and then retune its antennas back to the serving cell. The UE may repeat the measurement process periodically during each configured measurement gap.

Figure 4:
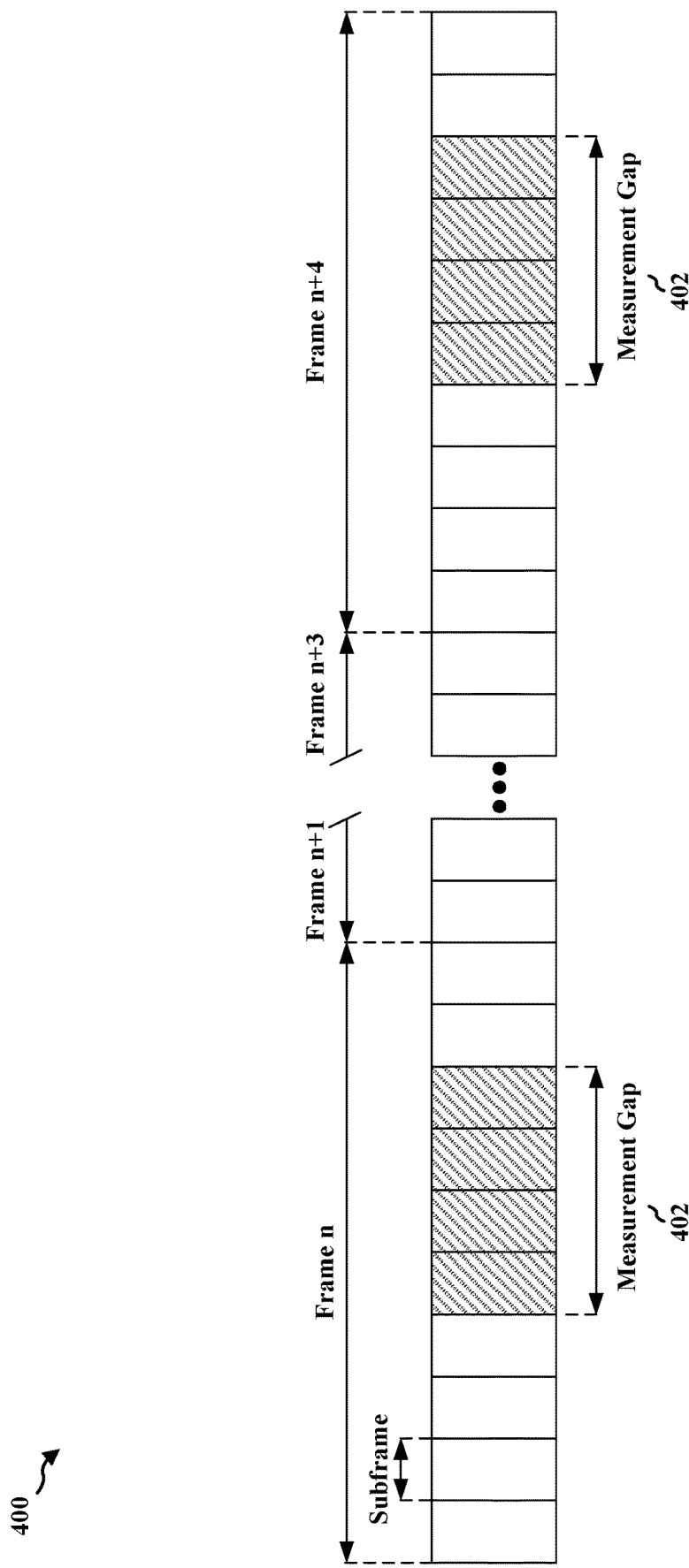
FIG. 4 is a diagram illustrating an example of a measurement gap.

FIG. 4 illustrates an example 400 of a measurement gap 402. When the UE receives a measurement configuration from the base station, the measurement configuration may include a measurement gap configuration indicating a measurement gap length (e.g. 1.5, 3, 3.5, 4, 5.5, 6 ms, etc.), a measurement gap repetition periodicity (e.g. 20, 40, 80, 160 ms, etc.), and other criteria. For instance, FIG. 4 illustrates an example where the base station configures the UE with a measurement gap length of 4 ms (e.g. 4 subframes) and a measurement repetition periodicity of 40 ms (e.g. occurring after every 4 frames), although different gap lengths and periodicities may be configured in other examples. During each measurement gap 402, the UE may perform RF retuning to a different frequency, RAT, or cell, perform measurements, and then perform RF tuning back from the different frequency, RAT, or cell.

However, in some cases while a UE is performing measurements during a configured measurement gap, a serving base station may still send scheduling grants to the UE. For example, in EN-DC, a lack of measurement gap coordination may exist between the eNB/MN providing the measurement configuration and the gNB/SN providing scheduling grants for data. As a result, the gNB/SN may transmit scheduling grants to the UE during the measurement gaps. As the UE is unable to receive the grants since the UE has tuned out from the gNB/SN to perform measurements during these periods of time, the UE may not report HARQ feedback to the base station acknowledging (or not acknowledging) the scheduling grants. Consequently, the base station may inaccurately determine from the lack of HARQ feedback that the UE is currently in a DRX mode, and thus the base station may refrain from further transmitting grants for a period of time. Generally in DRX, the UE monitors the radio channel periodically for downlink data during an "on" duration and powers down most of its circuitry to save battery life during an "off" duration, and therefore the base station typically transmits data to the UE during the on duration while refraining from transmitting data to the UE during the off duration to save resources. Accordingly, the base station may refrain from transmitting scheduling grants to the UE for a period of time based on the incorrect assumption that the UE is in the off duration, even though the UE may have completed its measurements, has retuned back to the serving gNB/SN, and is in the on duration during this period of time. Thus, data transmissions to the UE may be inefficiently stalled, resulting in reduced data throughput.

Figure 5:
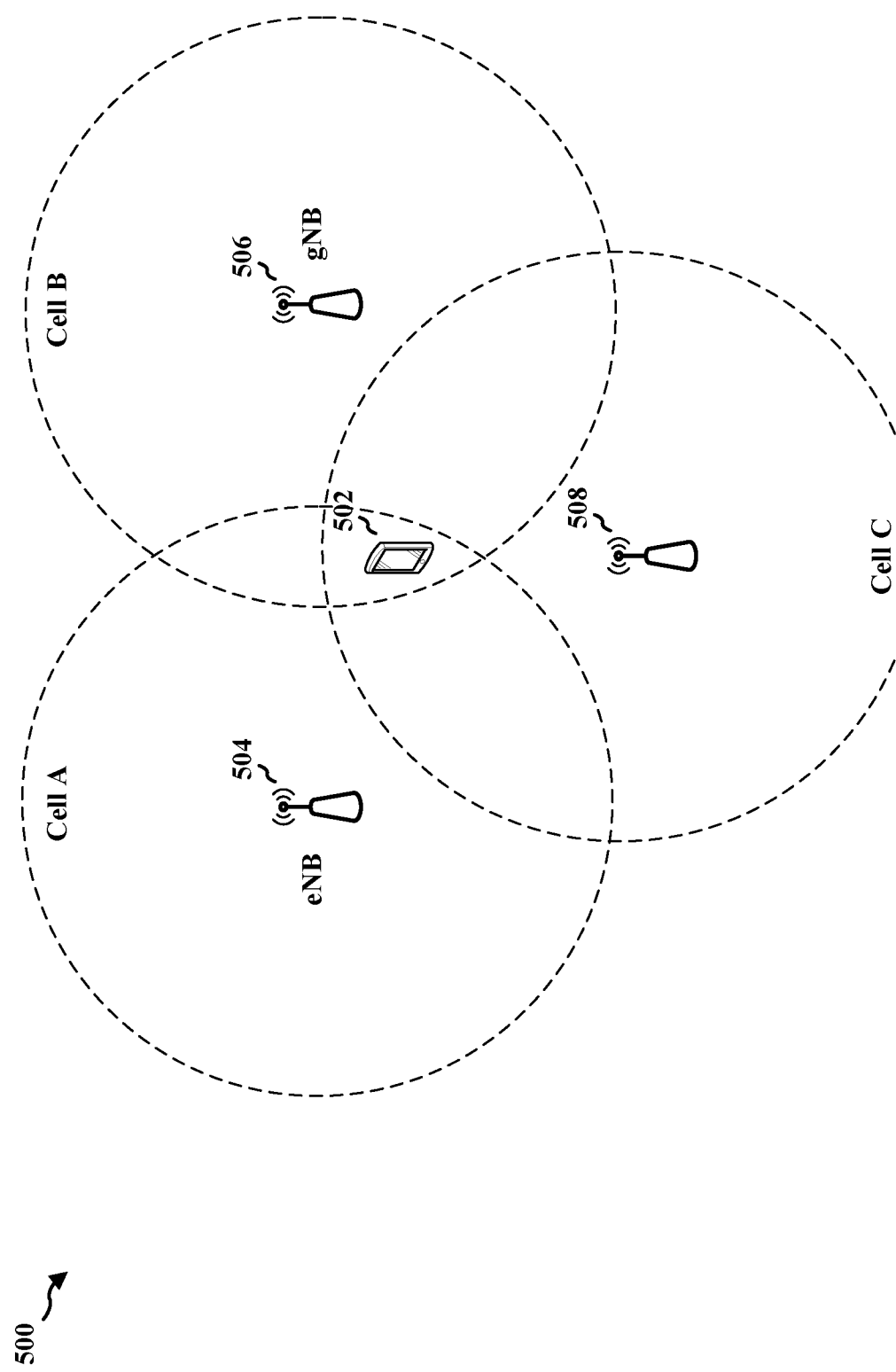
FIG. 5 is a diagram of a UE in communication with different base stations.

FIG. 5 illustrates an example 500 of a UE 502 in communication with serving base stations in EN-DC, including an eNB 504 (MN) and a gNB 506 (SN). The eNB 504 and gNB 506 may be in respective serving cells A and B, respectively. The eNB 504 may provide a measurement configuration to the UE 502 (e.g. via RRC signaling) to perform intra-frequency, inter-frequency, or inter-RAT measurements of a reference signal from a neighbor base station 508 in a neighbor cell C. The measurement configuration may include a configured measurement occasion or measurement gap (e.g. measurement gap 402) during which the UE 502 may periodically perform its measurements. At the beginning of the UE's DRX on duration, the gNB 506 may send reference signals (e.g. CSI-RS) and scheduling grants for downlink data, uplink data, or measurement reports (e.g. CSI reports). However, due to a lack of measurement gap coordination between the eNB 504 and gNB 506, the gNB 506 may continue to send scheduling grants to the UE 502 while the UE is performing measurements during measurement gaps. As the UE 502 does not expect to receive data while performing its measurements, the UE may not send HARQ feedback to gNB 506, causing the gNB to incorrectly determine the UE to be in the DRX off duration. As a result, the gNB 506 may stop transmitting scheduling grants to the UE, resulting in data stalling at least until after the UE experiences an actual DRX off duration and subsequent DRX on duration.

To prevent this data stalling from occurring in such cases, the UE may transmit a SR to the serving base station after performing a measurement based on the measurement configuration. The SR may inform the serving base station that the UE is not in the DRX off duration and currently has data to transmit to the base station. For example, to initiate the SR procedure, the UE may trigger a BSR (e.g. a regular BSR) in response to determining a decrease in an amount of data received from the serving base station and/or in an amount of uplink grants received from the serving base station following a measurement gap. To identify whether such decrease has occurred, the UE may first determine whether a threshold amount of data and/or a threshold amount of uplink grants, e.g. x bytes of data and/or z number of grants, was received from the base station within a threshold amount of time prior to performing the measurement, e.g. y ms before the measurement gap, where x, y, and z are preconfigured thresholds. For example, referring to FIGS. 4 and 5, the UE 502 may determine whether at least 20 KB of data (or some other threshold amount of data) or at least 3 uplink grants (or some other threshold number of grants) was received from gNB 506 (or eNB 504) in the last 5 ms (or some other threshold amount of time) before one of the measurement gaps 402. If so, then the UE may next determine whether the UE tuned to a different frequency, RAT, or cell (relative to a frequency, RAT, or cell of the serving base station) to perform a measurement during the measurement gap. For example, referring to FIGS. 4 and 5, the UE 502 may determine from the measurement configuration that the UE measured RSRP of an SSB, CSI-RS, or some other downlink signal of neighbor base station 508 during the same one of the measurement gaps 402. If so, then the UE may determine whether another threshold amount of data and/or another threshold amount of uplink grants, e.g. a bytes of data and/or c number of grants, was not received from the base station within another threshold amount of time after performing the measurement, e.g. b ms after the measurement gap, where a, b, and c are preconfigured thresholds and may respectively be the same as or different than x, y, and z. For example, referring to FIGS. 4 and 5, the UE 502 may determine whether at least 20 KB of data (or some other threshold amount of data) or at least 3 uplink grants (or some other threshold number of grants) was not received from eNB 504 or gNB 506 in the last 5 ms (or some other threshold amount of time) after measurement gap 402. If so, the UE may determine that a decrease in received data or received grants has occurred since the measurement gap, and the UE may transmit SR accordingly to prevent the serving base station from incorrectly determining the UE to be in the DRX off duration.

For example, if the UE has not received an uplink grant to transmit data after the measurement gap, the UE may trigger the regular BSR and initiate a SR procedure. For instance, the UE may periodically transmit SR on PUCCH a configured number of times until the UE receives an uplink grant from the serving base station (e.g. eNB 504 or gNB 506), in response to which the UE may transmit the BSR (e.g. in a MAC-CE). As a result of the SR (or BSR), the serving base station may determine that the UE is not in a DRX mode or DRX off duration and that the UE is thus able to decode scheduling grants and data, thereby preventing data stalling and improving data throughput.

Figure 6:
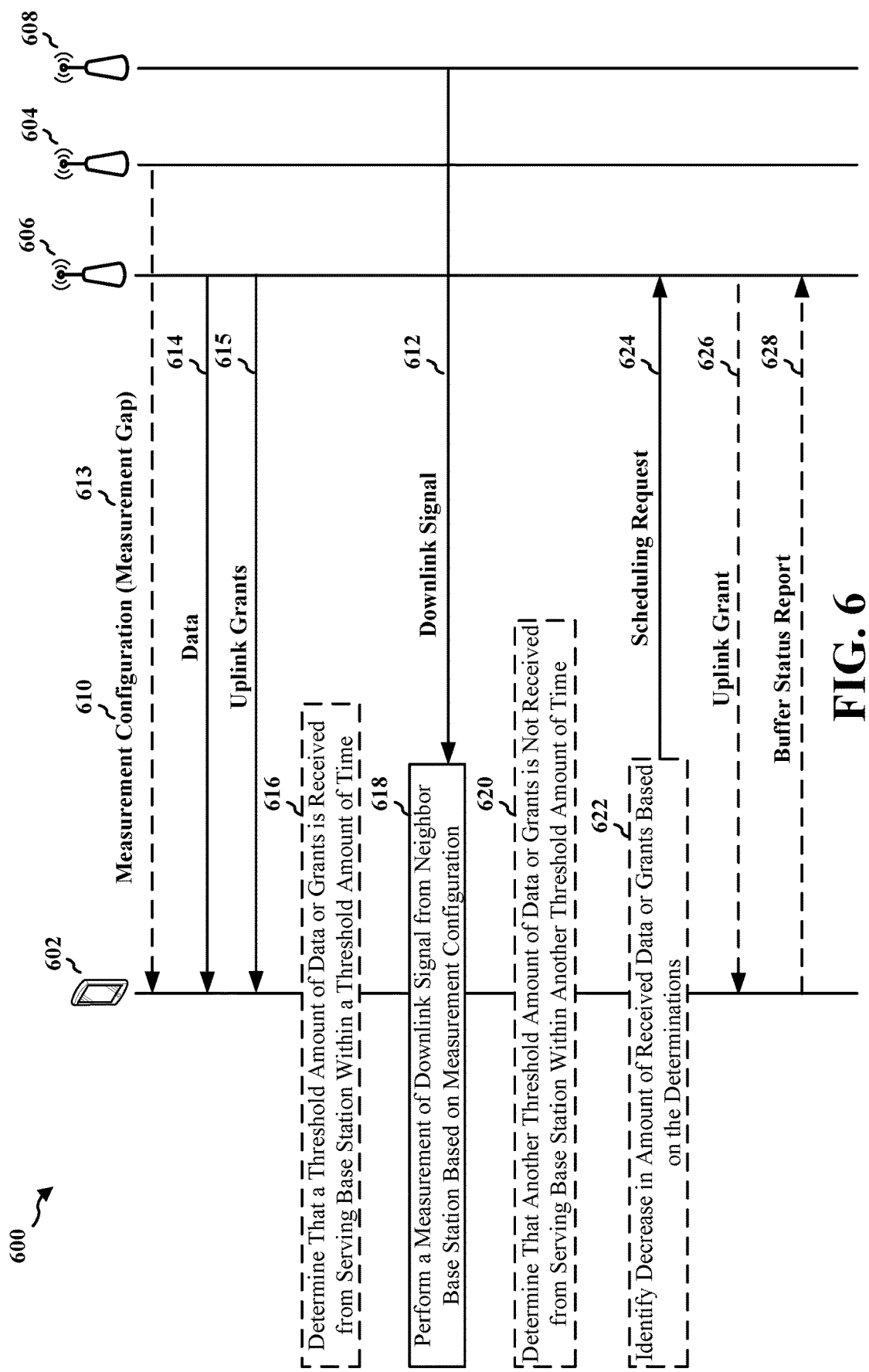
FIG. 6 is a call flow diagram between a UE and multiple base stations.

FIG. 6 illustrates an example 600 of a call flow between a UE 602 and base stations 604, 606, 608. Referring to FIG. 5, UE 602 may correspond to UE 502, base station 604 may correspond to eNB 504 in serving cell A, base station 606 may correspond to gNB 506 in serving cell B, and base station 608 may correspond to neighbor base station 508 in neighbor cell C. Alternatively, in some cases, base station 604 may correspond to gNB 506 in serving cell B, and base station 606 may correspond to eNB 504 in serving cell A. The UE 602 may initially receive a measurement configuration 610 from base station 604 configuring the UE to perform measurements of a downlink signal 612 from base station 608. The measurement configuration 610 may also include a measurement gap 613 indicating the period of time during which the UE is to perform the measurements (e.g. measurement gap 402). Afterwards, the UE may receive data 614 and uplink grants 615 from base station 606, as well as reference signals (e.g. CSI-RS) and scheduling grants for downlink data and CSI reports. Although not shown, the UE may similarly receive data 614 and uplink grants 615 from base station 604.

Next, at 616, the UE may determine that a threshold amount of data (e.g. data 614) or a threshold amount of uplink grants (e.g. uplink grants 615) is received from a serving base station within a threshold amount of time. For example, the UE 602 may determine that at least 20 KB of data (or some other number) or at least 3 uplink grants (or some other number) was received from base station 606 (or base station 604) in the last 5 ms (or some other number) before measurement gap 613. Then, at 618, the UE may perform a measurement of a downlink signal from a neighbor base station based on the measurement configuration. For example, the UE 602 may measure an RSRP, a reference signal receive quality (RSRQ), or a signal-to-noise ratio (SNR) of downlink signal 612 (e.g. SSB, CSI-RS, DMRS, etc.) from base station 608 during measurement gap 613, as configured in measurement configuration 610. After performing the measurement, then at 620, the UE may determine that another threshold amount of data or another threshold amount of uplink grants is not received from the serving base station within another threshold amount of time. For example, the UE 602 may determine that at least 20 KB of data (or some other number) or at least 3 uplink grants (or some other number) was not received from base station 606 (or base station 604) in the last 5 ms (or some other number) after measurement gap 613. For instance, as illustrated in FIG. 6, the UE may determine that no data or uplink grants were received from base station 606 or 604 after performing the measurement at 618.

Accordingly, at 622, the UE may identify a decrease in amount of received downlink data or uplink grants from the serving base station based on the determinations at 616 and 620, and consequently the UE may transmit a scheduling request 624 to base station 606 (or base station 604) to inform the serving base station that the UE has data available to transmit. As a result, the base station 606 (or 604) may send an uplink grant 626 to the UE 602 including configured resources for the uplink transmission, and the UE may subsequently send a BSR 628 to the corresponding base station in the configured resources. Thus, a degradation in data throughput may be avoided. Additionally, while the example of FIG. 6 illustrates the determination at 616 being performed before the measurement at 618, in other examples, the UE may perform the determination at 616 after performing the measurement at 618.

Moreover, while FIG. 6 illustrates the example where the UE transmits SR in response to identifying that a decrease has occurred in either an amount of received downlink data or an amount of uplink grants, the UE may alternatively transmit SR in response to identifying that a decrease has occurred in both an amount of received data and an amount of uplink grants. In such case, the UE may perform the determinations at 616 and 620 separately for each amount (i.e. data and uplink grants) based on same or different threshold amounts of data, uplink grants, or time. For instance, the UE may transmit SR in response to identifying that at least 20 KB of data (or some other number) was not received from base station 606 (or base station 604) in the last 5 ms (or some other number) after measurement gap 613, and in response to further identifying that at least 3 uplink grants were not received from base station 606 (or base station 604) in the last 5 ms (or some other number) after measurement gap 613. Thus, SR may be transmitted in response to decreases in received downlink data, decreases in received uplink grants, or a combination of the two.

Figure 7:
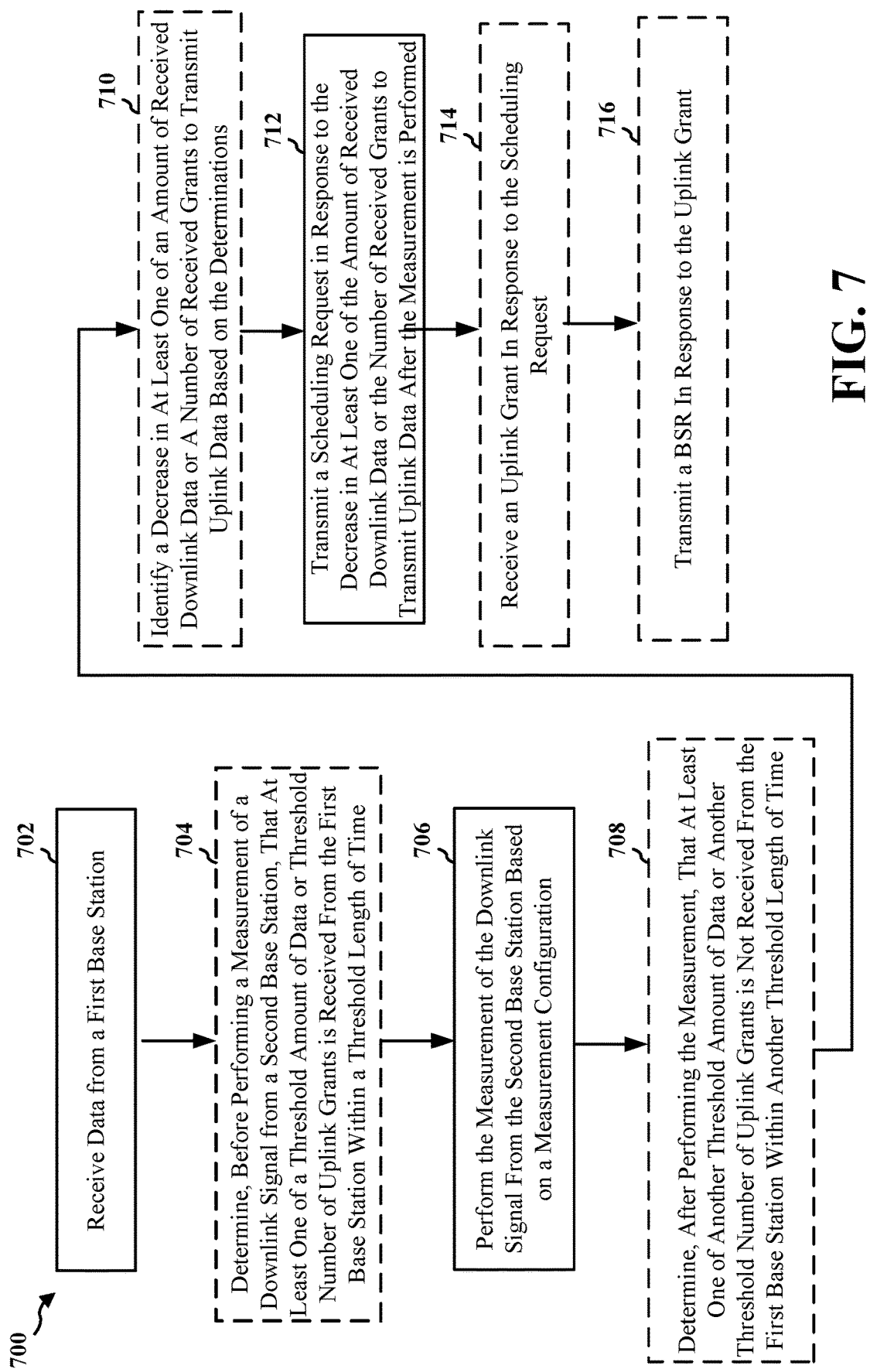
FIG. 7 is a flowchart of a method of wireless communication.

FIG. 7 is a flowchart 700 of a method of wireless communication. The method may be performed by a UE (e.g., the UE 104, 350, 502, 602; the apparatus 802). Optional aspects are illustrated in dashed lines. The method allows a UE to trigger initiation of an SR procedure in response to a decrease in at least one of an amount of received downlink data or uplink grants following a measurement gap in order to avoid inefficient data stalls caused by erroneous DRX determinations by a base station.

At 702, the UE receives data from a first base station. For example, 702 may be performed by data component 840. For instance, referring to FIG. 6, the UE 602 may receive data 614 from base station 606. The UE 350, 602 may receive the data 614 from base station 310, 606, for example, according to the following example process: the UE may obtain the data using one or more of the antennas 352, the UE may demodulate the obtained data (e.g., in RX processor 356), and the UE may decode the demodulated data (e.g., in the controller/processor 359). The UE may also store the decoded data in memory 360.

At 704, the UE may determine, before performing a measurement of a downlink signal from a second base station, that a threshold amount of data is received from the first base station within a threshold length of time. Alternatively or additionally, the UE may determine at 704, before performing the measurement, that a threshold number of uplink grants is received from the first base station within a threshold length of time. Thus, at 704, the UE may determine, before performing the measurement, that at least one of a threshold amount of data or a threshold number of uplink grants is received from the first base station within a threshold length of time. For example, 704 may be performed by first determination component 842. For instance, referring to FIG. 6, the UE 602 may determine at 616, before performing a measurement at 618 of downlink signal 612 from base station 608, that a threshold amount of data such as x bytes of data and/or a threshold number of uplink grants such as z number of grants is received from base station 606 within a threshold length of time such as y ms before measurement gap 613. The thresholds x and z may be the same as or different from each other. In an example process of making the determination at 616, the UE 602 (e.g., the controller/processor 359 of UE 350) may count, within a configured (threshold) period of time y ms (prior to measuring downlink signal 612), a number of bytes of data received from base station 606 and/or a number of uplink grants received from base station 606, the UE may compare the counted number of bytes and/or number of uplink grants with a threshold amount of data (x bytes) and/or a threshold number of uplink grants (z grants), respectively, and the UE may identify that the counted number of bytes and/or number of uplink grants at least meet the threshold amount of data and/or threshold number of uplink grants, respectively (e.g., the number of counted bytes is at least x bytes and/or the number of counted grants is at least z grants).

At 706, the UE performs the measurement of the downlink signal from the second base station based on a measurement configuration. For example, 706 may be performed by measurement component 844. For instance, referring to FIG. 6, the UE 602 may perform the measurement at 618 of downlink signal 612 from base station 608. In an example process of performing the measurement at 618, the UE (e.g., the controller/processor 359 of UE 350) may receive the downlink signal from base station 608 (e.g., using one or more antennas 352 and following demodulation and decoding of the downlink signal), and the UE may obtain an RSRP, a RSRQ, or a SNR of the downlink signal 612. Moreover, the measurement may be performed at 618 based on the measurement configuration 610. For instance, the measurement configuration may include one or more measurement objects indicating the frequency, time location, and subcarrier spacing of reference signal(s) (e.g., downlink signal 612) the UE is to measure (e.g. SSB, CSI-RS, DMRS, etc.) from base station 608, and the UE may perform the measurement of the reference signal(s) indicated in the configured measurement object(s). The measurement configuration may be received from a third base station in dual connectivity with the first base station (e.g. base station 604 such as illustrated in FIG. 6). Alternatively, the measurement configuration may be received from the first base station (e.g. base station 606) in another example. Furthermore, the measurement configuration may indicate a measurement gap (e.g. measurement gap 613), and the measurement may be performed at 618 during the measurement gap. For instance, the UE may measure the reference signal(s) indicated in the configured measurement object(s) during the measurement gap 402 indicated in the measurement configuration.

At 708, the UE may determine, after performing the measurement, that another threshold amount of data is not received from the first base station within another threshold length of time. Alternatively or additionally, the UE may determine at 708, after performing the measurement, that another threshold number of uplink grants is not received from the first base station within another threshold length of time. Thus, at 708, the UE may determine, after performing the measurement, that at least one of another threshold amount of data or another threshold number of uplink grants is not received from the first base station within another threshold length of time. For example, 708 may be performed by second determination component 846. The another threshold amount of time may be the same as, or different from, the threshold amount of time referenced at 704, the another threshold number of uplink grants may be the same as, or different from, the threshold number of uplink grants referenced at 704, and the another threshold length of time may be the same as, or different from, the threshold length of time referenced at 704. For instance, referring to FIG. 6, the UE 602 may determine at 620, after performing the measurement at 618, that another threshold amount of data such as a bytes of data or another threshold number of uplink grants such as c number of uplink grants is not received from base station 606 within another threshold length of time such as b ms after measurement gap 613. In an example process of making the determination at 620, the UE 602 (e.g., the controller/processor 359 of UE 350) may count, within a configured (threshold) period of time b ms (after measuring downlink signal 612), a number of bytes of data received from base station 606 and/or a number of uplink grants received from base station 606, the UE may compare the counted number of bytes and/or number of uplink grants with a threshold amount of data (a bytes) and/or a threshold number of uplink grants (c grants), respectively, and the UE may identify that the counted number of bytes and/or number of uplink grants do not meet the threshold amount of data and/or threshold number of uplink grants, respectively (e.g., the number of counted bytes is less than a bytes and/or the number of counted grants is less than c grants). The thresholds a and c may be the same as or different from each other, the thresholds a and x may be the same as or different from each other, the thresholds c and z may be the same as or different from each other, and the thresholds b and y may be the same as or different from each other.

At 710, the UE may identify a decrease in an amount of received downlink data based on the determinations at 704 and 708. Alternatively or additionally, the UE may identify at 710 a decrease in an amount of received grants to transmit uplink data based on the determinations at 704 and 708. Thus, at 710, the UE may identify a decrease in at least one of an amount of received downlink data or a number of received grants to transmit uplink data based on the determinations at 704 and 708. For example, 710 may be performed by identification component 848. For instance, referring to FIG. 6, the UE 602 may identify at 622 a decrease in an amount of received downlink data since measurement gap 613 based on the determinations at 616 and 620. Alternatively or additionally, the UE 602 may identify at 622 a decrease in an amount of received grants to transmit uplink data since measurement gap 613 based on the determinations at 616 and 620. In an example process of making the identification at 622, the UE (e.g., the controller/processor 359 of UE) may determine as described above at 616 that a counted number of received bytes and/or counted number of received uplink grants prior to the measurement gap at least meet the threshold amount of data and/or threshold number of uplink grants, the UE may determine as described above at 620 that another counted number of received bytes and/or another counted number of received uplink grants after the measurement gap do not meet the threshold amount of data and/or threshold number of uplink grants, and the UE may ascertain the decrease has occurred in response to both determinations.

At 712, the UE transmits a scheduling request in response to a decrease in at least one of an amount of received downlink data or a number of received grants to transmit uplink data after the measurement is performed at 706. For example, 712 may be performed by scheduling request component 850. The decrease may be the decrease identified at 710. For instance, referring to FIG. 6, the UE 602 may transmit scheduling request 624 to base station 606 in response to the identification of the decrease at 622 and after performing the measurement at 618. The scheduling request may be transmitted in an absence of receiving a grant after performing the measurement at 706. For instance, the UE 602 may transmit scheduling request 624 if the UE does not receive an uplink grant from base station 606 following measurement gap 613. The UE 350, 602 may transmit the scheduling request to base station 310, 606, for example, according to the following example process: the UE may encode the scheduling request (e.g., in the controller/processor 359), the UE may modulate the encoded scheduling request (e.g., in the TX processor 368), and the UE may send the modulated and encoded scheduling request using one or more of the antennas 352.

The scheduling request may also be transmitted at 712 in response to a BSR being triggered. For instance, referring to FIG. 6, the UE may trigger a BSR in response to identifying the decrease at 710 (and 622), after which the UE transmits the scheduling request 624 at 712. Moreover, after transmitting the scheduling request, at 714, the UE may receive an uplink grant in response to the scheduling request, and at 716, the UE may transmit the BSR in response to the uplink grant. For example, 714 may be performed by uplink grant component 852, and 716 may be performed by BSR component 854. For instance, referring to FIG. 6, the UE 602 may receive uplink grant 626 in response to the scheduling request 624, and the UE may transmit BSR 628 in response to uplink grant 626. The UE 350, 602 may receive the uplink grant from base station 310, 606, for example, according to the following example process: the UE may obtain the grant using one or more of the antennas 352, the UE may demodulate the obtained grant (e.g., in RX processor 356), and the UE may decode the demodulated grant (e.g., in the controller/processor 359). The UE may also store the decoded grant in memory 360. Moreover, the UE 350, 602 may transmit the BSR to base station 310, 606, for example, according to the following example process: the UE may encode the BSR (e.g., in the controller/processor 359), the UE may modulate the encoded BSR (e.g., in the TX processor 368), and the UE may send the modulated and encoded BSR using one or more of the antennas 352.

In one example, the second base station may be of a different RAT than the first base station. For instance, referring to FIG. 6, base station 608 may an eNB while base station 606 may be a gNB. In another example, the downlink signal from the second base station may be received on a different frequency than the data received from the first base station. For instance, referring to FIG. 6, downlink signal 612 from base station 608 may be received on different frequency than data 614 from base station 606. In a further example, the second base station may be in a different cell than the first base station. For instance, referring to FIG. 6, base station 608 may be in a different cell (e.g. neighbor base station 508 in cell C of FIG. 5) than base station 606 (e.g. gNB 506 in cell B of FIG. 5).

Figure 8:
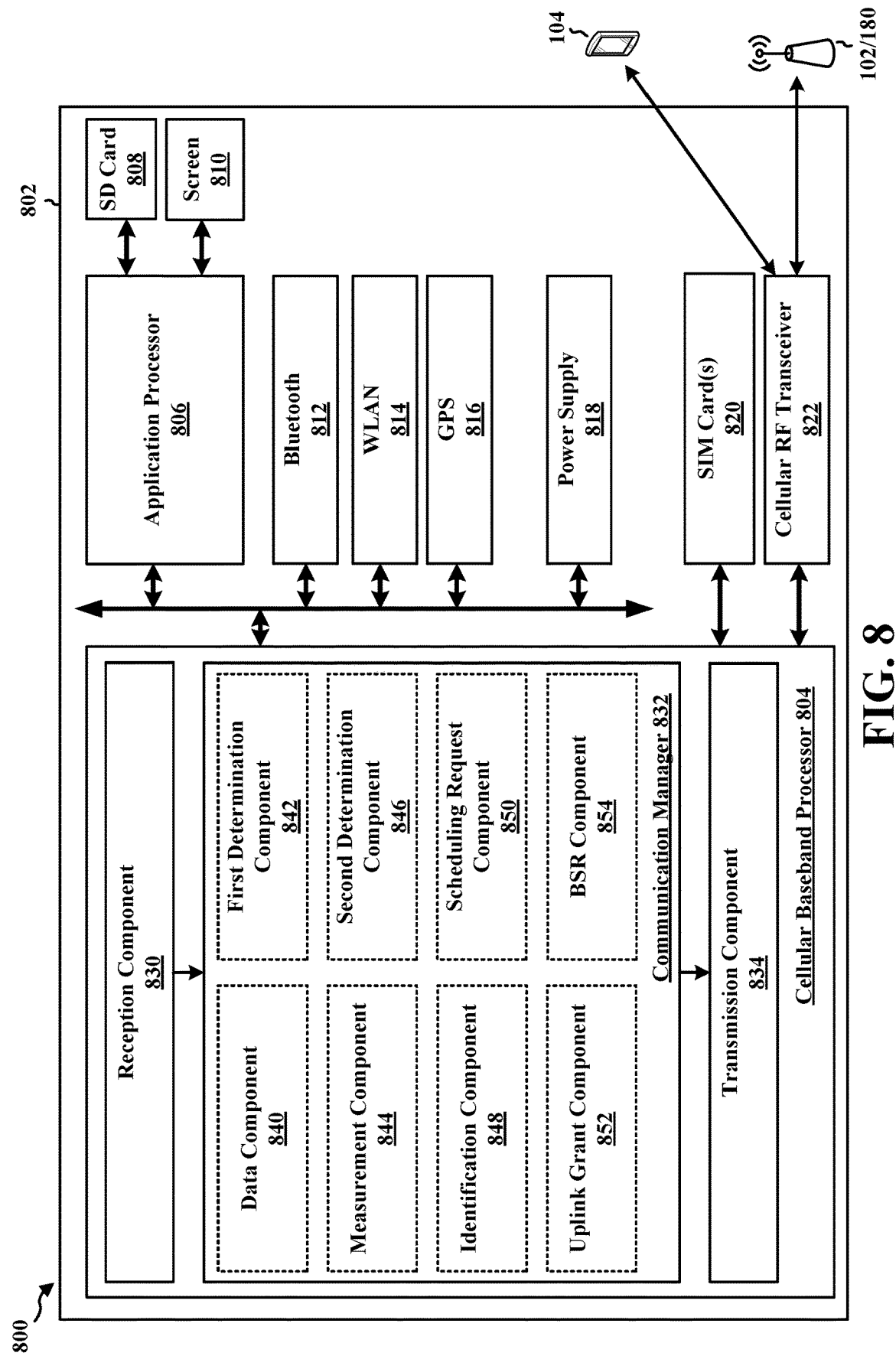
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The communication manager 832 includes a data component 840 that is configured to receive data from a first base station, e.g., as described in connection with 702. The communication manager 832 further includes a first determination component 842 that receives input in the form of data from data component 840 and is configured to determine, before performing the measurement, that at least one of a threshold amount of data or a threshold number of uplink grants is received from the first base station within a threshold length of time, e.g., as described in connection with 704. The communication manager 832 further includes a measurement component 844 that is configured to perform a measurement of a downlink signal from a second base station based on a measurement configuration, e.g., as described in connection with 706. The communication manager 832 further includes a second determination component 846 that receives input in the form of data from data component 840 and is configured to determine, after performing the measurement, that at least one of another threshold amount of data or another threshold number of uplink grants is not received from the first base station within another threshold length of time, e.g., as described in connection with 708. The communication manager 832 further includes an identification component 848 that receives input in the form of the determinations from first determination component 842 and second determination component 846 and is configured to identify the decrease in the at least one of the amount of the received downlink data or the number of the received grants to transmit the uplink data based on the determinations, e.g., as described in connection with 710. The communication manager 832 further includes a scheduling request component 850 that receives input in the form of the data from data component 840 and measurement from measurement component 844, as well as the identification from identification component 848, and is configured to transmit a scheduling request in response to a decrease in at least one of an amount of received downlink data or a number of received grants to transmit uplink data after the measurement is performed, e.g., as described in connection with 712. The communication manager 832 further includes an uplink grant component 852 that is configured to receive an uplink grant in response to the scheduling request, e.g., as described in connection with 714. The communication manager 832 further includes a BSR component 854 that receives input in the form of the uplink grant from uplink grant component 852 and is configured to transmit the BSR in response to the uplink grant, e.g., as described in connection with 716.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for receiving data from a first base station, means for performing a measurement of a downlink signal from a second base station based on a measurement configuration, and means for transmitting a scheduling request in response to a decrease in at least one of an amount of received downlink data or a number of received grants to transmit uplink data after the measurement is performed.

In one configuration, the measurement configuration may be received from the first base station or a third base station in dual connectivity with the first base station.

In one configuration, the scheduling request may be transmitted in an absence of receiving a grant after performing the measurement.

In one configuration, the scheduling request may be transmitted in response to a BSR being triggered. In one configuration, the means for receiving may be further configured to receive an uplink grant in response to the scheduling request, and the means for transmitting may be further configured to transmit the BSR in response to the uplink grant.

In one configuration, the measurement configuration may indicate a measurement gap, and the measurement may be performed during the measurement gap.

In one configuration, the second base station may be of a different RAT than the first base station. In one configuration, the downlink signal from the second base station may be received on a different frequency than the data received from the first base station. In one configuration, the second base station may be in a different cell than the first base station.

In one configuration, the apparatus 802, and in particular the cellular baseband processor 804, may include means for determining, before performing the measurement, that at least one of a threshold amount of data or a threshold number of uplink grants is received from the first base station within a threshold length of time. The means for determining may be further configured to determine, after performing the measurement, that at least one of another threshold amount of data or another threshold number of uplink grants is not received from the first base station within another threshold length of time. The apparatus 802, and in particular the cellular baseband processor 804, may also include means for identifying the decrease in the at least one of the amount of the received downlink data or the number of the received grants to transmit the uplink data based on the determinations.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a UE, comprising: receiving data from a first base station; performing a measurement of a downlink signal from a second base station based on a measurement configuration; and transmitting a scheduling request in response to a decrease in at least one of an amount of received downlink data or a number of received grants to transmit uplink data after the measurement is performed.

Example 2 is the method of Example 1, wherein the measurement configuration is received from the first base station or a third base station in dual connectivity with the first base station.

Example 3 is the method of any of Examples 1 and 2, wherein the scheduling request is transmitted in an absence of receiving a grant after performing the measurement.

Example 4 is the method of any of Examples 1 to 3, wherein the scheduling request is transmitted in response to a BSR being triggered.

Example 5 is the method of Example 4, further comprising: receiving an uplink grant in response to the scheduling request; and transmitting the BSR in response to the uplink grant.

Example 6 is the method of any of Examples 1 to 5, wherein the measurement configuration indicates a measurement gap, and wherein the measurement is performed during the measurement gap.

Example 7 is the method of any of Examples 1 to 6, wherein the second base station is of a different RAT than the first base station.

Example 8 is the method of any of Examples 1 to 7, wherein the downlink signal from the second base station is received on a different frequency than the data received from the first base station.

Example 9 is the method of any of Examples 1 to 8, wherein the second base station is in a different cell than the first base station.

Example 10 is the method of any of Examples 1 to 9, further comprising: determining, before performing the measurement, that at least one of a threshold amount of data or a threshold number of uplink grants is received from the first base station within a threshold length of time; determining, after performing the measurement, that at least one of another threshold amount of data or another threshold number of uplink grants is not received from the first base station within another threshold length of time; and identifying the decrease in the at least one of the amount of the received downlink data or the number of the received grants to transmit the uplink data based on the determinations.

Example 11 is an apparatus for wireless communication, comprising: a processor; memory coupled with the processor; and instructions stored in the memory and operable, when executed by the processor, to cause the apparatus to: receive data from a first base station; perform a measurement of a downlink signal from a second base station based on a measurement configuration; and transmit a scheduling request in response to a decrease in at least one of an amount of received downlink data or a number of received grants to transmit uplink data after the measurement is performed.

Example 12 is the apparatus of Example 11, wherein the measurement configuration is received from the first base station or a third base station in dual connectivity with the first base station.

Example 13 is the apparatus of any of Examples 11 and 12, wherein the scheduling request is transmitted in an absence of receiving a grant after performing the measurement.

Example 14 is the apparatus of any of Examples 11 to 13, wherein the scheduling request is transmitted in response to a BSR being triggered.

Example 15 is the apparatus of Example 14, wherein the instructions, when executed by the processor, further cause the apparatus to: receive an uplink grant in response to the scheduling request; and transmit the BSR in response to the uplink grant.

Example 16 is the apparatus of any of Examples 11 to 15, wherein the measurement configuration indicates a measurement gap, and wherein the measurement is performed during the measurement gap.

Example 17 is the apparatus of any of Examples 11 to 16, wherein the second base station is of a different RAT than the first base station.

Example 18 is the apparatus of any of Examples 11 to 17, wherein the downlink signal from the second base station is received on a different frequency than the data received from the first base station.

Example 19 is the apparatus of any of Examples 11 to 18, wherein the second base station is in a different cell than the first base station.

Example 20 is the apparatus of any of Examples 11 to 19, wherein the instructions, when executed by the processor, further cause the apparatus to: determine, before performing the measurement, that at least one of a threshold amount of data or a threshold number of uplink grants is received from the first base station within a threshold length of time; determine, after performing the measurement, that at least one of another threshold amount of data or another threshold number of uplink grants is not received from the first base station within another threshold length of time; and identify the decrease in the at least one of the amount of the received downlink data or the number of the received grants to transmit the uplink data based on the determinations.

Example 21 is an apparatus for wireless communication, comprising: means for receiving data from a first base station; means for performing a measurement of a downlink signal from a second base station based on a measurement configuration; and means for transmitting a scheduling request in response to a decrease in at least one of an amount of received downlink data or a number of received grants to transmit uplink data after the measurement is performed.

Example 22 is the apparatus of Example 21, wherein the measurement configuration is received from the first base station or a third base station in dual connectivity with the first base station.

Example 23 is the apparatus of any of Examples 21 and 22, wherein the scheduling request is transmitted in an absence of receiving a grant after performing the measurement.

Example 24 is the apparatus of any of Examples 21 to 23, wherein the scheduling request is transmitted in response to a BSR being triggered.

Example 25 is the apparatus of Example 24, wherein the means for receiving is further configured to receive an uplink grant in response to the scheduling request; and wherein the means for transmitting is further configured to transmit the BSR in response to the uplink grant.

Example 26 is the apparatus of any of Examples 21 to 25, wherein the measurement configuration indicates a measurement gap, and wherein the measurement is performed during the measurement gap.

Example 27 is the apparatus of any of Examples 21 to 26, wherein the second base station is of a different RAT than the first base station.

Example 28 is the apparatus of any of Examples 21 to 27, wherein the downlink signal from the second base station is received on a different frequency than the data received from the first base station.

Example 29 is the apparatus of any of Examples 21 to 28, wherein the second base station is in a different cell than the first base station.

Example 30 is the apparatus of any of Examples 21 to 29, further comprising: means for determining, before performing the measurement, that at least one of a threshold amount of data or a threshold number of uplink grants is received from the first base station within a threshold length of time; wherein the means for determining is further configured to determine, after performing the measurement, that at least one of another threshold amount of data or another threshold number of uplink grants is not received from the first base station within another threshold length of time; and means for identifying the decrease in the at least one of the amount of the received downlink data or the number of the received grants to transmit the uplink data based on the determinations.

Example 31 is a computer-readable medium storing computer executable code, the code when executed by a processor cause the processor to: receive data from a first base station; perform a measurement of a downlink signal from a second base station based on a measurement configuration; and transmit a scheduling request in response to a decrease in at least one of an amount of received downlink data or a number of received grants to transmit uplink data after the measurement is performed.

What is claimed is:
1. A method of wireless communication at a user equipment (UE), comprising:
receiving data from a first base station;
performing, in a discontinuous reception (DRX) on duration, a measurement of a downlink signal from a second base station based on a measurement configuration;

determining, before performing the measurement, that at least one of a threshold amount of data or a threshold number of uplink grants is received from the first base station within a threshold length of time;

determining, after performing the measurement, that at least one of another threshold amount of data or another threshold number of uplink grants is not received from the first base station within another threshold length of time;

identifying a decrease in at least one of an amount of received downlink data or a number of received grants to transmit uplink data based on the determinations; and transmitting, in the DRX on duration, a scheduling request in response to the decrease in the at least one of the amount of the received downlink data or the number of the received grants to transmit the uplink data after the measurement is performed.

2. The method of claim 1, wherein the measurement configuration is received from the first base station or a third base station in dual connectivity with the first base station.

3. The method of claim 1, wherein the scheduling request is transmitted in an absence of receiving a grant after performing the measurement.

4. The method of claim 1, wherein the scheduling request is transmitted in response to a buffer status report (BSR) being triggered.

5. The method of claim 4, further comprising:
receiving an uplink grant in response to the scheduling request; and
transmitting the BSR in response to the uplink grant.

6. The method of claim 1, wherein the measurement configuration indicates a measurement gap, and wherein the measurement is performed during the measurement gap.

7. The method of claim 1, wherein the second base station is of a different radio access technology (RAT) than the first base station.

8. The method of claim 1, wherein the downlink signal from the second base station is received on a different frequency than the data received from the first base station.

9. The method of claim 1, wherein the second base station is in a different cell than the first base station.

10. An apparatus for wireless communication, comprising:
one or more processors;
one or more memories each coupled with at least one of the one or more processors; and
instructions stored in the one or more memories, individually or in combination, and operable, when executed by the one or more processors, individually or in combination, to cause the apparatus to:
receive data from a first base station;
perform, in a discontinuous reception (DRX) on duration, a measurement of a downlink signal from a second base station based on a measurement configuration;
determine, before performing the measurement, that at least one of a threshold amount of data or a threshold number of uplink grants is received from the first base station within a threshold length of time;
determine, after performing the measurement, that at least one of another threshold amount of data or another threshold number of uplink grants is not received from the first base station within another threshold length of time;
identify a decrease in at least one of an amount of received downlink data or a number of received grants to transmit uplink data based on the determinations; and
transmit, in the DRX on duration, a scheduling request in response to the decrease in the at least one of the amount of the received downlink data or the number of the received grants to transmit the uplink data after the measurement is performed.

11. The apparatus of claim 10, wherein the measurement configuration is received from the first base station or a third base station in dual connectivity with the first base station.

12. The apparatus of claim 10, wherein the scheduling request is transmitted in an absence of receiving a grant after performing the measurement.

13. The apparatus of claim 10, wherein the scheduling request is transmitted in response to a buffer status report (BSR) being triggered.

14. The apparatus of claim 13, wherein the instructions, when executed by the one or more processors, individually or in combination, further cause the apparatus to:
receive an uplink grant in response to the scheduling request; and
transmit the BSR in response to the uplink grant.

15. The apparatus of claim 10, wherein the measurement configuration indicates a measurement gap, and wherein the measurement is performed during the measurement gap.

16. The apparatus of claim 10, wherein the second base station is of a different radio access technology (RAT) than the first base station.

17. The apparatus of claim 10, wherein the downlink signal from the second base station is received on a different frequency than the data received from the first base station.

18. The apparatus of claim 10, wherein the second base station is in a different cell than the first base station.

19. An apparatus for wireless communication, comprising:
means for receiving data from a first base station;
means for performing, in a discontinuous reception (DRX) on duration, a measurement of a downlink signal from a second base station based on a measurement configuration;
means for determining, before performing the measurement, that at least one of a threshold amount of data or a threshold number of uplink grants is received from the first base station within a threshold length of time;
the means for determining being further configured to determine, after performing the measurement, that at least one of another threshold amount of data or another threshold number of uplink grants is not received from the first base station within another threshold length of time;
means for identifying a decrease in at least one of an amount of received downlink data or a number of received grants to transmit uplink data based on the determinations; and
means for transmitting, in the DRX on duration, a scheduling request in response to the decrease in the at least one of the amount of the received downlink data or the number of the received grants to transmit the uplink data after the measurement is performed.

20. The apparatus of claim 19, wherein the scheduling request is transmitted in an absence of receiving a grant after performing the measurement.

21. The apparatus of claim 19, wherein the scheduling request is transmitted in response to a buffer status report (BSR) being triggered.

22. The apparatus of claim 21,
wherein the means for receiving is further configured to receive an uplink grant in response to the scheduling request; and
wherein the means for transmitting is further configured to transmit the BSR in response to the uplink grant.

23. The apparatus of claim 19, wherein the measurement configuration indicates a measurement gap, and wherein the measurement is performed during the measurement gap.

24. The apparatus of claim 19, wherein the second base station is of a different radio access technology (RAT) than the first base station.

25. The apparatus of claim 19, wherein the downlink signal from the second base station is received on a different frequency than the data received from the first base station.

26. The apparatus of claim 19, wherein the second base station is in a different cell than the first base station.

27. One or more non-transitory computer-readable media comprising computer executable code, the code when executed by one or more processors causes the one or more processors, individually or in combination, to:
receive data from a first base station;
perform, in a discontinuous reception (DRX) on duration, a measurement of a downlink signal from a second base station based on a measurement configuration;
determine, before performing the measurement, that at least one of a threshold amount of data or a threshold number of uplink grants is received from the first base station within a threshold length of time;
determine, after performing the measurement, that at least one of another threshold amount of data or another threshold number of uplink grants is not received from the first base station within another threshold length of time;
identify a decrease in at least one of an amount of received downlink data or a number of received grants to transmit uplink data based on the determinations; and
transmit, in the DRX on duration, a scheduling request in response to the decrease in the at least one of the amount of the received downlink data or the number of the received grants to transmit the uplink data after the measurement is performed.

\* \* \* \* \*